United States Patent [19]

Takahashi et al.

[11] Patent Number: 5,261,705
[45] Date of Patent: Nov. 16, 1993

[54] COUPLING FOR HIGH PRESSURE FLUID

[75] Inventors: Takeshi Takahashi, Mishima; Takashi Yamamoto, Susono, both of Japan

[73] Assignee: Toyota Jidosha Kabushiki Kaisha, Aichi, Japan

[21] Appl. No.: 858,116

[22] Filed: Mar. 26, 1992

[30] Foreign Application Priority Data

Apr. 8, 1991 [JP] Japan .................................. 3-75149

[51] Int. Cl.⁵ .............................................. F16L 41/08
[52] U.S. Cl. ...................................... 285/197; 285/114; 285/332; 285/334.4; 285/332.2
[58] Field of Search ...................... 285/197, 156, 334.4, 285/332.2, 332.3, 351, 114, 332

[56] References Cited

U.S. PATENT DOCUMENTS

| | | | |
|---|---|---|---|
| 2,147,254 | 2/1939 | Hinderliter | 285/332.2 |
| 4,832,376 | 5/1989 | Sugao | 285/197 X |
| 4,900,180 | 2/1990 | Takikawa | 285/156 X |
| 4,953,896 | 9/1990 | Usui | 285/197 |
| 5,120,084 | 6/1992 | Hashimoto | 285/334.4 |
| 5,172,939 | 12/1992 | Hashimoto | 285/197 X |

Primary Examiner—Dave W. Arola
Attorney, Agent, or Firm—Kenyon & Kenyon

[57] ABSTRACT

A coupling for connecting a connecting pipe to a main pipe. The coupling comprises a coupling member and a nut screwed into the coupling member. A projection having an arc-shaped cross-section and extending in the circumferential direction of the outer wall of the main pipe is formed on the outer wall of the main pipe, and the coupling member is rotatably fitted onto the projection. A conical shape groove connected to the high pressure fluid passage in the main pipe is formed on the outer wall of the main pipe, and the tip portion of the connecting pipe is pressed against the conical shape groove by tightening down the nut.

15 Claims, 5 Drawing Sheets

COUPLING FOR HIGH PRESSURE FLUID

BACKGROUND OF THE INVENTION

1. Field of the Invention

The present invention relates to a coupling for high pressure fluid.

2. Description of the Related Art

In a common rail type Diesel engine, for example, fuel under a high pressure of more than 100 MPa, discharged from the fuel feed pump, is fed into the main pipe via a connecting pipe connected to the main pipe, and the fuel under high pressure fed into the main pipe is distributed to the fuel injectors via corresponding connecting pipes connected to the main pipe. In this case, generally speaking, the connecting pipes cannot be directly welded to the main pipe, and thus each connecting pipe is normally connected to the main pipe via a coupling.

In a known coupling for connecting a connecting pipe to the main pipe, the coupling member is fitted to the main pipe, and then welded thereon, and a groove, connected to the high pressure fuel flow passage in the main pipe and diverging toward the outside of the main pipe, is formed on the outer face of the main pipe. The tip portion of the connecting pipe is pressed against the groove by urging the connecting pipe onto the main pipe by tightening a nut fitted to the coupling member (see Japanese Unexamined Utility Model publication Nos. 64-4994 and 64-4995).

In general, when assembling the connecting pipes, when one end of each of the connecting pipes is connected to the fuel pump or the fuel injector, the other end of each connecting pipe is not normally aligned with the axis of the groove formed on the main pipe, i.e., the other end of the connecting pipe is normally inclined relative to the axis of the groove. Nevertheless, where the connecting pipe has a high flexibility, even if the other end of the connecting pipe, i.e., the tip portion of the connecting pipe, is not completely aligned with the axis of the groove, as mentioned above, and the coupling member is welded to the main pipe, the connecting pipe can be deformed so that the tip portion of the connecting pipe is aligned with the axis of the groove when the tip portion of the connecting pipe is urged toward the main pipe by the nut. Accordingly, in this case, no serious problems arise.

Where, however, a fuel under high pressure is to flow within the connecting pipe, it is necessary to considerably increase the thickness of the wall of the connecting pipe, and as a result, the flexibility of the connecting pipe becomes extremely low. Accordingly, in this case, if the tip portion of the connecting pipe is forcibly aligned with the axis of the groove, by urging the tip portion of the connecting pipe toward the main pipe by the nut, an excessive stress is generated in the connecting pipe and in the portion of the coupling member welded to the main pipe, and as a result, a problem arises in that the connecting pipe and the welded portion of the coupling member are damaged.

SUMMARY OF THE INVENTION

An object of the present invention is to provide a coupling wherein an excessive stress is not generated in the connecting pipe or the coupling member.

According to the present invention, there is provided a coupling device for connecting a connecting pipe to a main pipe having a fluid passage therein, the device comprising: a projection projecting outward from an outer circumferential wall of the main pipe and having an arc-shaped cross-section, the projection extending in a circumferential direction of the outer circumferential wall of the main pipe; a coupling member having a bore able to be fitted over the projection and allowing a rotation of the coupling member thereon; and fastening means mounted on the coupling member for pressing a tip face of the connecting pipe against a groove formed in the outer circumferential wall of the main pipe and connected to the fluid passage, to thereby connect the connecting pipe to the fluid passage.

The present invention may be more fully understood from the description of preferred embodiments of the invention set forth below, together with the accompanying drawings.

DESCRIPTION OF PREFERRED EMBODIMENTS

FIGS. 1 through 8 illustrate the application of the present invention to the fuel supply system of a Diesel engine.

Figure 1:
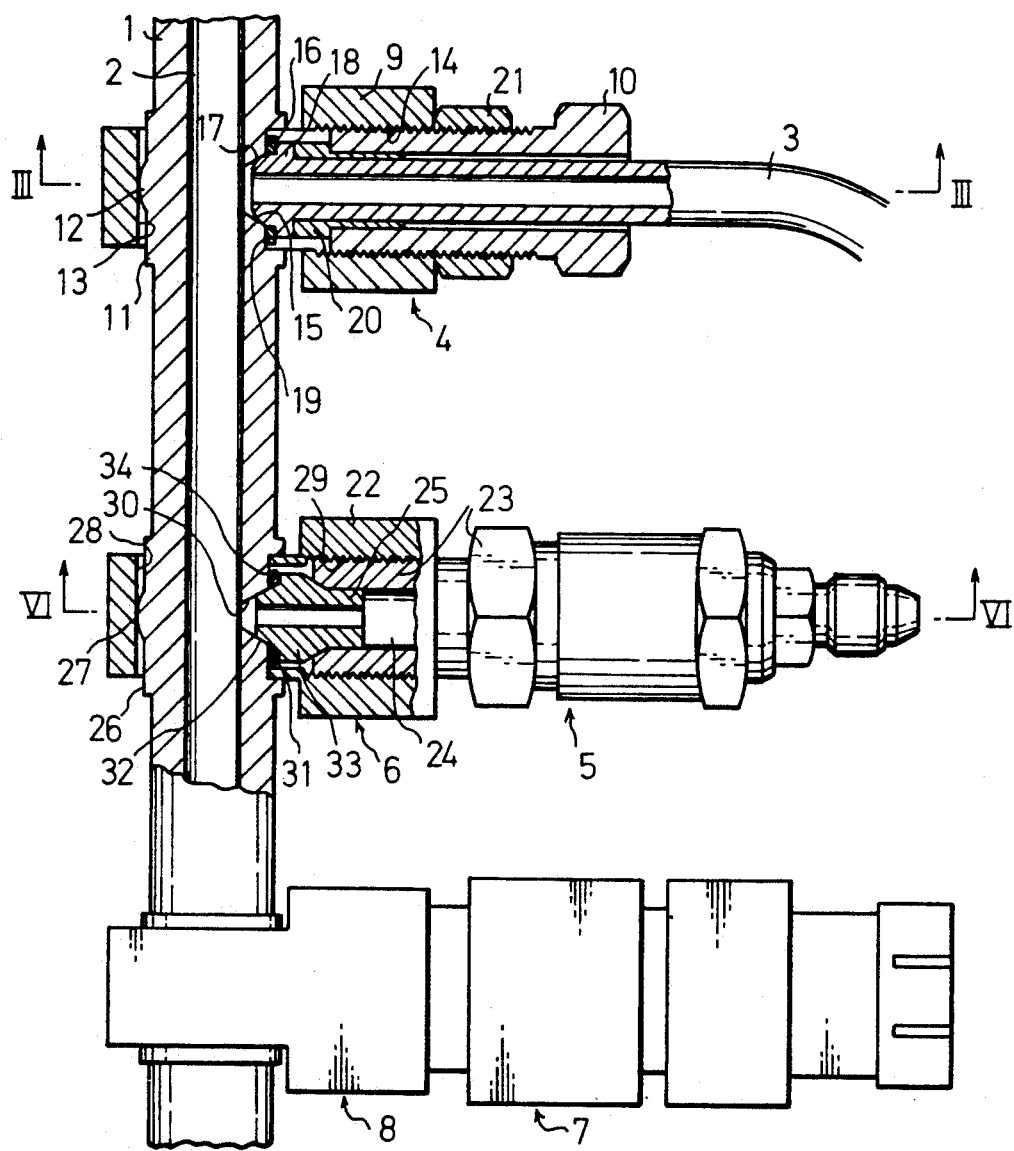
FIG. 1 is a partially cross-sectional plan view of the main pipe, the connecting pipe and the coupling.
Figure 2:
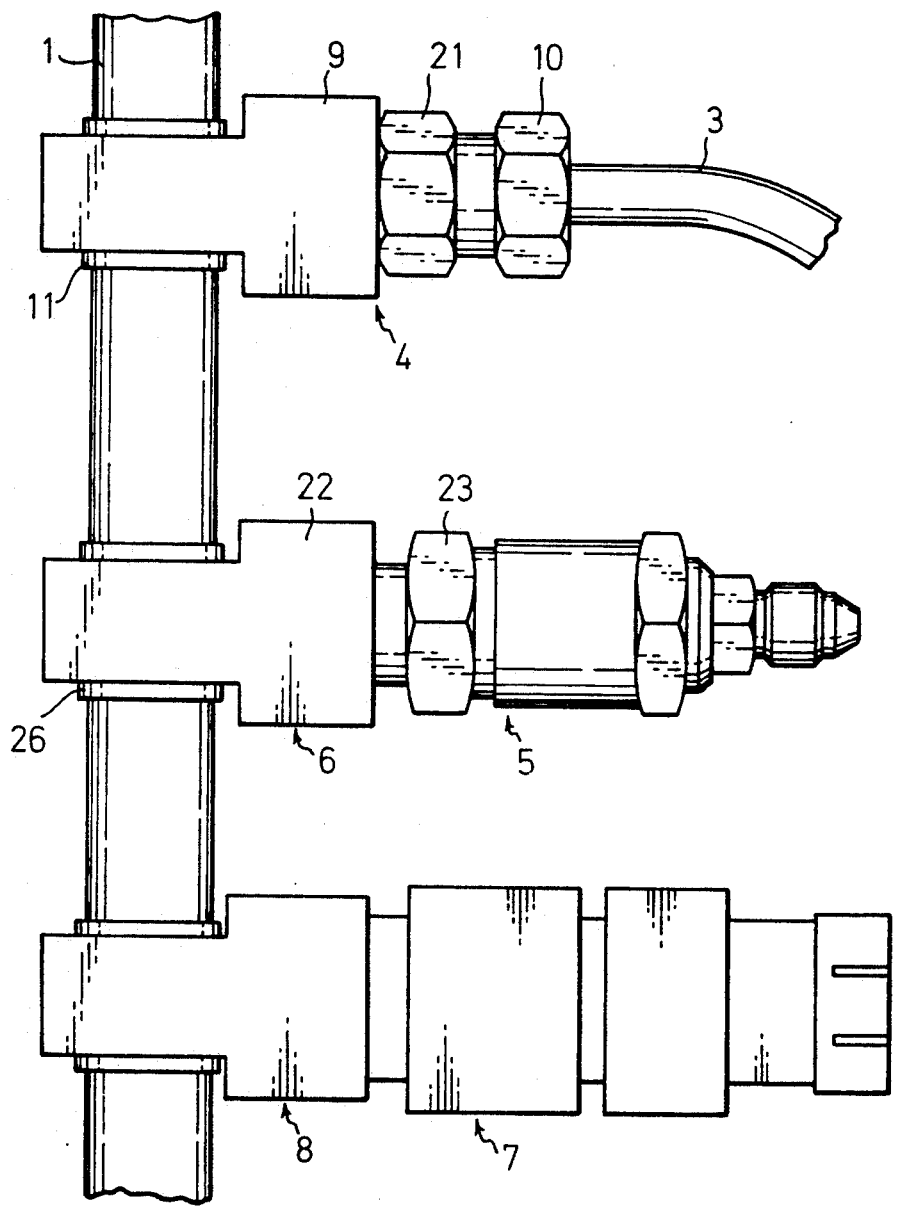
FIG. 2 is a plan view of FIG. 1.

Referring to FIGS. 1 and 2, reference numeral 1 designates a main pipe for carrying a high pressure fluid, 2 a high pressure fuel passage formed in the main pipe 1, 3 a connecting pipe connected to the main pipe 1 by a coupling 4, 5 a safety valve connected to the main pipe 1 by a coupling 6, and 7 designates a pressure sensor connected to the main pipe 1 by a coupling 8. The opposed ends of the high pressure fuel passage 2 are closed by blind plugs (not shown).

The connecting pipe 3 is connected to a fuel pump (not shown), and fuel under a high pressure of more than 100 MPa, discharged from the fuel pump, is fed into the high pressure fuel passage 2 via the connecting pipe 3. A plurality of connecting pipes (not shown in FIGS. 1 and 2) connected to the corresponding fuel injectors (not shown) and having the same construction as that of the connecting pipe 3 are connected to the main pipe 1 via corresponding couplings (not shown) having the same construction as that of the coupling 4, and fuel under high pressure in the high pressure fuel passage 2 is fed into the fuel injectors via these connecting pipes. The safety valve 5 is provided for allowing the fuel in the high pressure fuel passage 2 to escape to the outside thereof when the pressure of fuel in the high pressure fuel passage 2 becomes higher than a predetermined pressure, and the pressure sensor 7 is provided for detecting the pressure of fuel in the high pressure fuel passage 2.

Next, a method of connecting the connecting pipe 3 to the main pipe 1 is explained, with reference to FIGS. 1, 3, 4 and 5.

Figure 3:
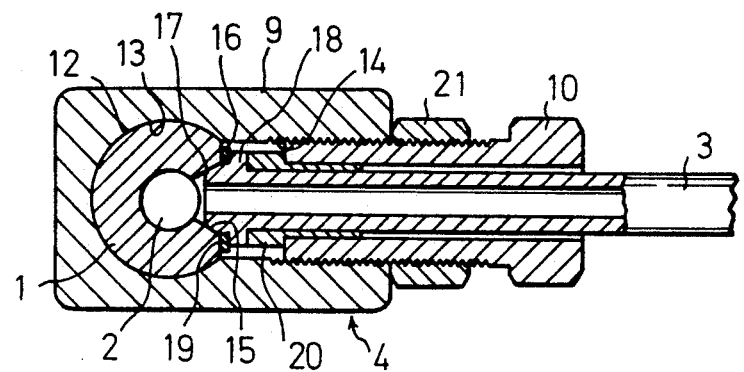
FIG. 3 is a cross-sectional view taken along the line III-IV in FIG. 1.
Figure 4:
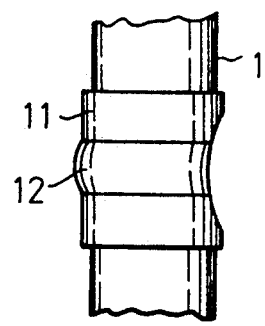
FIG. 4 is a plan view of a portion of the main pipe.
Figure 5:
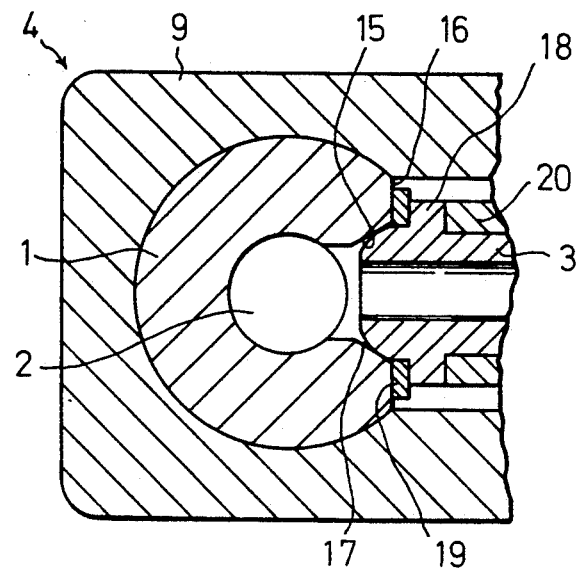
FIG. 5 is an enlarged cross-sectional view of a portion of FIG. 3.

As illustrated in FIGS. 1 and 3, the coupling 4 comprises a coupling member 9 and a nut 10. A portion of the outer circumferential wall of the main pipe 1 on which the coupling member 9 is mounted is expanded outward; this expanded portion 11 has the same diameter over the entire length thereof. A projection 12 having an arc-shaped cross-section and extending in the circumferential direction of the cylindrical outer circumferential wall of the expanded portion 11, over the entire circumference thereof, is formed on the cylindrical outer circumferential wall of the expanded portion 11. The coupling member 9 has a bore 13 having an inner diameter almost the same as the outer diameter of the projection 12, and the bore 13 of the coupling member 9 is rotatably fitted onto the projection 12.

Further, a threaded bore 14 extending toward the bore 13 is formed in the coupling member 9, and the nut 10 is screwed into the threaded bore 14. A conically shaped groove 15 connected to the high pressure fuel passage 2 and conically diverging toward the threaded bore 14 is formed on the outer circumferential wall of the expanding portion 11 of the main pipe 1, and the surrounding portion of the open end of the conically shaped groove 15 is formed into an annular flat face 16.

The tip face 17 of the connecting pipe 3 has a spherical shape, and this spherically shaped tip face 17 is seated on the conically shape groove 15. A flange 18 is integrally formed on the outer circumferential wall of the connecting pipe 3 at a position slightly inward from the spherical shape tip face 17. A seal member 19 is inserted between the flange 18 and the flat face 16, and a spacer 20 is inserted between the flange 18 and the nut 10. When the nut 10 is rotated in the tightening down direction, the tightening force is transmitted to the flange 18 via the spacer 20, whereby the spherical shape tip face 17 of the connecting pipe 3 is pressed against the conically shaped groove 15. Thereafter, a clamping nut 21 is screwed down into contact with the nut 10, to ensure that the nut 10 is not loosened by vibration, etc.

Since the bore 13 of the coupling member 9 is rotatably fitted on the projection 12 of the main pipe 1 as mentioned above, the coupling member 9 not only can be rotated about the axis of the main pipe 1, but also can be tilted in all directions relative to a plane perpendicular to the axis of the main pipe 1. Accordingly, even if the tip portion of the connecting pipe 3 is inclined with respect to the axis of the conically shaped groove 15, the tip portion of the connecting pipe 3 is fastened to the main pipe 1 by the nut 10 in a state such that the connecting pipe 3 is inclined, i.e., the coupling member 9 is inclined. Accordingly, there is no danger of the generation of an excessive stress in the coupling member 9 or the connecting pipe 3.

Further, even if the connecting pipe 3 is fastened to the main pipe 1 in a state such that the connecting pipe 3 is inclined as mentioned above, since the tip face 17 of the connecting pipe 17 has a spherical shape, the tip face 17 of the connecting pipe 3 comes into line contact with the conically shaped groove 15 along a circular contact line, and as a result, a good sealing operation can be obtained.

The coupling 6 of the safety valve 5 has almost the same construction as that of the coupling 8 of the pressure sensor 7. Accordingly, only the coupling 8 of the safety valve 7 will be now described, with reference to FIGS. 1, 6 and 7.

Figure 6:
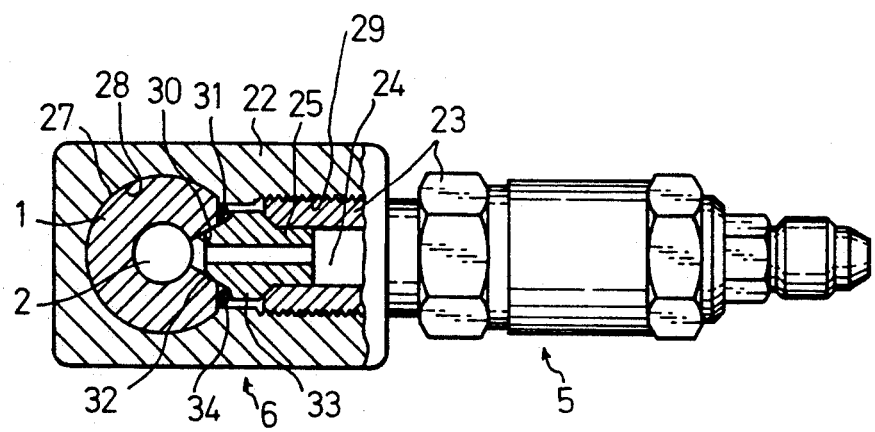
FIG. 6 is a cross-sectional view taken along the line VI—VI in FIG. 1.
Figure 7:
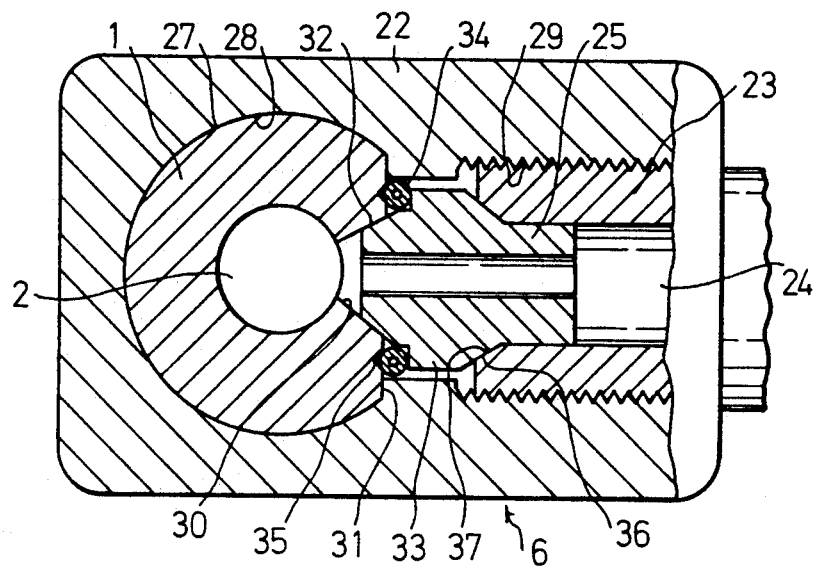
FIG. 7 is an enlarged cross-sectional view of a portion of FIG. 6.

As illustrated in FIGS. 1, 6 and 7, in the safety valve 5 also, the coupling 6 comprises a coupling member 22 and a nut 23, and a connecting pipe 25 is inserted between the main pipe 1 and the nut 23 to introduce fuel in the high pressure fuel passage 2 into the fuel passage 24 formed in the safety valve 5. Further, in this safety valve 5, a portion of the outer circumferential wall of the main pipe 1, on which the coupling member 22 is mounted, is expanded outward, and this expanded portion 26 has the same diameter over the entire length thereof. A projection 27 having an arc-shaped cross-section and extending in the circumferential direction of the cylindrical outer circumferential wall of the expanding portion 26, over the entire circumference thereof, is formed on the cylindrical outer circumferential wall of the expanded portion 26. The coupling member 22 has a bore 28 having an inner diameter almost the same as the outer diameter of the projection 27, and the bore 28 of the coupling member 22 is rotatably fitted onto the projection 27.

Furthermore, a threaded bore 29 extending toward the bore 28 is formed in the coupling member 22, and the nut 23 is screwed into the threaded bore 29. A conically shaped groove 30 connected to the high pressure fuel passage 2 and conically diverging toward the threaded bore 29 is formed on the outer circumferential wall of the expanded portion 26 of the main pipe 1, and the surrounding portion of the open end of the conical shape groove 30 is formed into an annular flat face 31.

The tip face 32 of the connecting pipe 25 has a conical shape, and this conically shaped tip face 32 is seated on the conically shaped groove 30. A flange 33 is integrally formed on the outer circumferential wall of the connecting pipe 25 at a position slightly inward from the conically shaped tip face 32. A seal member 34 is inserted between the flange 33 and the flat face 31, and a V-shaped groove 35 (FIG. 7) is formed on the flat face 31 to retain the seal member 34 at a regular position. Also, as illustrated in FIG. 7, the inner end face 36 of the flange 33 has a conical shape, and the inner end face 37 of the nut 23 also has a conical shape. The conical shape inner and face 37 of the nut 23 is seated on the conical shape inner end face 36 of the flange 33. When the nut 23 is rotated in the tightening down direction, the tightening force is transmitted to the flange 33, whereby the conical shape tip face 32 of the connecting pipe 33 is pressed against the conically shaped groove 30.

Also, in the safety valve 5, since the bore 28 of the coupling member 22 is rotatably fitted on the projection 27 of the main pipe 1, the coupling member 22 can not only rotate about the axis of the main pipe 1 but also can be tilted in all directions relative to a plane perpendicular to the axis of the main pipe 1. Accordingly, even if the tip portion of the connecting pipe 25 is inclined with respect to the axis of the conically shaped groove 30 due to an error during the production of the conically shaped groove 30 or the conically shaped tip face 32 of the connecting pipe 25, when the conically tip face 32 of the connecting pipe 25 is seated on the conically shaped groove 30, the tip portion of the connecting pipe 25 is fastened to the main pipe 1 by the nut 23 in a state such that the connecting pipe 25 is inclined, i.e., the coupling member 22 is inclined. Accordingly, there is no danger of a generation of an excessive stress in the coupling member 22 or the connecting pipe 25.

Figure 8:
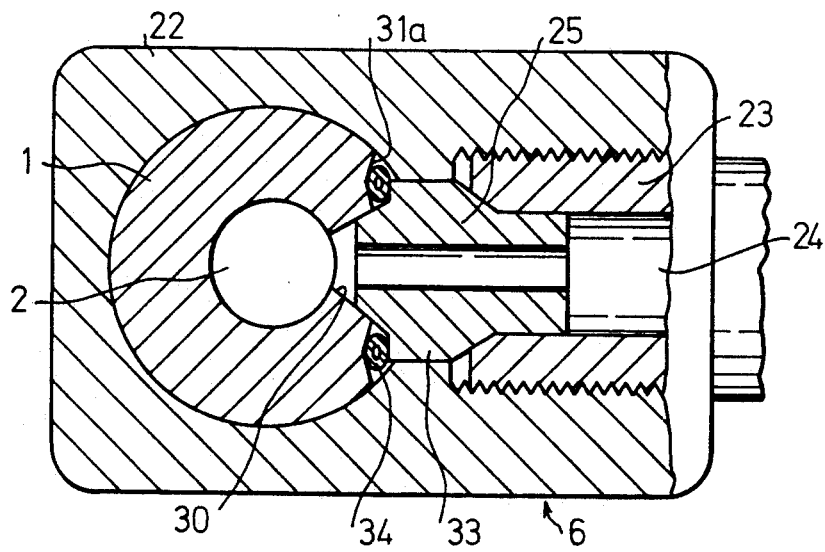
FIG. 8 is a cross-sectional side view of an alternative embodiment of the present invention.

FIG. 8 illustrates an alternative embodiment of the coupling 6. In this embodiment, the surrounding portion of the open end of the conically shaped groove 30 is formed int an annular face 31a having a V-shaped cross-section, and a seal member 34 is inserted between the annular face 31a and the flange 33.

According to the present invention, as mentioned above, it is possible to prevent a generation of an excessive stress in the connecting pipe and the coupling member when the connecting pipe is connected to the main pipe by the coupling.

Although the invention has been described by reference to specific embodiments chosen for purposes of illustration, it should be apparent that numerous modifications could be made thereto by those skilled in the art without departing from the basic concept and scope of the invention.

We claim:

1. A coupling for connecting a connecting pipe having a tip face to a main pipe having a fluid passage therein and a groove formed in an outer circumferential wall of the main pipe, wherein the groove is connected to the fluid passage and, wherein the main pipe defines a central axis, said coupling comprising:
    a projection projecting outward from the outer circumferential wall of the main pipe opposite said groove wherein the cross-section of said projection taken on any plane passing through said projection including the central axis is arc-shaped, said projection extending in a circumferential direction out of the outer circumferential wall of the main pipe;
    a coupling member having a bore able to be rotatably fitted on said projection; and
    fastening means mounted on said coupling member for pressing said coupling member bore against said projection and the tip face of the connecting pipe against the groove formed in the outer circumferential wall of the main pipe to thereby connect the connecting pipe to the fluid passage.

2. A coupling device according to claim 1, wherein the bore of said coupling member has the same diameter over the entire length thereof, and wherein the diameter of the outer circumferential wall of the main pipe in an area in which the outer circumferential wall of the main pipe faces the bore of said coupling member, except for the area of said projection, is substantially the same as the diameter of the bore of the coupling member.

3. A coupling device according to claim 1, wherein said groove has a conical shape diverging toward the outside of the main pipe.

4. A coupling device according to claim 3, wherein the tip face of the connecting pipe has a spherical shape.

5. A coupling device according to claim 3, wherein the tip face of the connecting pipe has a conical shape.

6. A coupling device according to claim 1, wherein said coupling member has a threaded bore extending outward from the bore of said coupling member fitted on said projection, and said fastening means comprises a nut screwed onto said threaded bore.

7. A coupling device according to claim 6, wherein said connecting pipe has a flange formed on the outer face thereof, and the tip portion of said connecting pipe is pressed against said groove by urging said flange toward said groove by tightening down said nut.

8. A coupling device according to claim 7, wherein a portion of said connecting pipe extends through said nut, and a spacer is inserted between said flange and said nut.

9. A coupling device according to claim 7, wherein said nut defines a tip portion and, wherein a portion of said connecting pipe extends into said nut, and the tip portion of said nut is in direct contact with an end face of said flange.

10. A coupling device according to claim 9, wherein the tip portion of said nut and the end face of said flange have a conical shape.

11. A coupling device according to claim 7, wherein the outer circumferential wall of the main pipe has an annular face formed around said groove, and a seal member is inserted between said flange and said annular face.

12. A coupling device according to claim 11, wherein said annular face is flat.

13. A coupling device according to claim 11, wherein said annular face has an annular groove formed thereon having a V-shaped cross-section for receiving said seal member.

14. A coupling device according to claim 11, wherein said annular face has a V-shaped cross-section for receiving said seal member.

15. A coupling device according to claim 1, wherein, when said coupling member is rotatably fitted on the projection, an annular gap is formed between the bore of the coupling member and the outer circumferential wall of the main pipe such that the coupling member may be rotated about the central axis of the main pipe and may be rotated on the surface of the projection about an axis substantially perpendicular to the central axis.

* * * * *